(12) United States Patent
Wang et al.

(10) Patent No.: US 10,659,271 B2
(45) Date of Patent: May 19, 2020

(54) SIGNAL PROCESSING METHOD AND APPARATUS

(71) Applicant: HUAWEI TECHNOLOGIES CO., LTD., Shenzhen, Guangdong (CN)

(72) Inventors: Yi Wang, Shanghai (CN); Rongdao Yu, Shenzhen (CN); Sainan Li, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/225,220

(22) Filed: Dec. 19, 2018

(65) Prior Publication Data

US 2019/0132177 A1 May 2, 2019

Related U.S. Application Data

(63) Continuation of application No. PCT/CN2017/084185, filed on May 12, 2017.

(30) Foreign Application Priority Data

Jun. 24, 2016 (CN) .......................... 2016 1 0474088

(51) Int. Cl.
*H04L 27/26* (2006.01)
*H04L 1/00* (2006.01)
(Continued)

(52) U.S. Cl.
CPC .......... *H04L 27/2636* (2013.01); *H04L 1/003* (2013.01); *H04L 1/0025* (2013.01);
(Continued)

(58) Field of Classification Search
CPC . H04L 27/26; H04L 27/2614; H04L 27/2613; H04L 27/0628; H04L 27/3411;
(Continued)

(56) References Cited

U.S. PATENT DOCUMENTS 8,126,073 B2 2/2012 Miyoshi et al.
2007/0183386 A1 8/2007 Muharemovic et al.
(Continued)

FOREIGN PATENT DOCUMENTS

CN 101179540 A 5/2008
CN 102257753 A 11/2011
(Continued)

OTHER PUBLICATIONS

Extended European Search Report issued in European Application No. 17814526.4 dated May 8, 2019, 7 pages.
(Continued)

*Primary Examiner* — Mewale A Ambaye
(74) *Attorney, Agent, or Firm* — Fish & Richardson P.C.

(57) ABSTRACT

The present disclosure provides a signal processing method, including: performing discrete Fourier transform (DFT) on a data symbol block including M data symbols, where the M data symbols obtained after the DFT belong to K carriers, and at least two adjacent carriers in the K carriers are non-contiguous on a spectrum; or the M data symbols obtained after the DFT belong to K resource blocks of one carrier, and at least two adjacent resource blocks in the K resource blocks are non-contiguous on a spectrum; mapping the M symbols obtained after the DFT to M subcarriers corresponding to inverse fast Fourier transformation IFFT; and performing N-order IFFT on a plurality of mapped symbols.

20 Claims, 8 Drawing Sheets

(51) Int. Cl.
*H04L 27/36* (2006.01)
*H04L 27/38* (2006.01)
*H04L 27/34* (2006.01)

(52) U.S. Cl.
CPC .......... *H04L 27/26* (2013.01); *H04L 27/2628* (2013.01); *H04L 27/2666* (2013.01); *H04L 27/3411* (2013.01); *H04L 27/361* (2013.01); *H04L 27/38* (2013.01)

(58) Field of Classification Search
CPC ..... H04L 1/0003; H04L 1/0025; H04L 27/38; H04L 27/361
See application file for complete search history.

(56) References Cited

U.S. PATENT DOCUMENTS

| | | | |
|---|---|---|---|
| 2007/0280365 A1 | 12/2007 | Seki | |
| 2011/0199982 A1* | 8/2011 | Tee | H04L 27/2614 370/328 |
| 2012/0327875 A1* | 12/2012 | Han | H04L 27/2602 370/329 |
| 2013/0136071 A1* | 5/2013 | Han | H04L 5/0019 370/329 |
| 2013/0229998 A1 | 9/2013 | Noh et al. | |
| 2018/0192321 A1* | 7/2018 | Sahlin | H04L 5/0005 |

FOREIGN PATENT DOCUMENTS

| | | |
|---|---|---|
| CN | 102710404 A | 10/2012 |
| EP | 1936851 A2 | 6/2008 |
| EP | 2525543 A2 | 11/2012 |
| EP | 2530896 A2 | 12/2012 |
| WO | 2010021468 A2 | 2/2010 |

OTHER PUBLICATIONS

R1-084475,Nortel:"Comparison of DFTS-OFDMA with OFDMA", 3GPP TSG-RAN WG1#55, Prague, Czech, Nov. 10-14, 2008. 11 pages.

3GPP TR 25.814 V7.1.0 (Sep. 2006), 3rd Generation Partnership Project;Technical Specification Group Radio Access Network;Physical layer aspects for evolved Universal Terrestrial Radio Access (UTRA)(Release 7), Sep. 2006. 132 pages.

IEEE P802.11ay/D0.1,Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz. Jan. 2017. 181 pages.

International Search Report and Written Opinion issued in International Application No. PCT/CN2017/084185 dated Jul. 10, 2017, 16 pages.

Office Action issued in Chinese Application No. 201610474088.X dated Oct. 29, 2019, 15 pages (With English Translation).

* cited by examiner

SIGNAL PROCESSING METHOD AND APPARATUS

CROSS-REFERENCE TO RELATED APPLICATIONS

This application is a continuation of International Application No. PCT/CN2017/084185, filed on May 12, 2017, which claims priority to Chinese Patent Application No. 201610474088.X, filed on Jun. 24, 2016, the disclosures of the aforementioned applications are hereby incorporated by reference in their entireties.

TECHNICAL FIELD

The present disclosure relates to the field of wireless communications, and more specifically, to a signal processing method and apparatus.

BACKGROUND

A DFT-OFDM (discrete Fourier transform-orthogonal frequency division multiplexing) signal differs from a conventional OFDM (orthogonal frequency division multiplexing) signal in that DFT (discrete Fourier transform) transform is additionally performed before OFDM processing, and is currently used in an LTE (Long Term Evolution) mobile communications system and an IEEE 802.11 system. For example, the DFT-OFDM signal is used in uplink transmission in the LTE system. The DFT-OFDM signal is recorded in a standard as a DFT-S-OFDM (digital Fourier transform spread orthogonal frequency division multiplexing) signal, an SC-DFT-OFDM (single carrier digital Fourier transform orthogonal frequency division multiplexing) signal, or an SC-FDMA (single carrier frequency division multiple access) signal. In practice, the DFT-OFDM signal is usually referred to as a single carrier signal for short, and is one of candidate waveforms in a 5G mobile communications system. A baseband processing process of the single carrier signal is shown in FIG. 1. A DFT unit first performs M-order discrete Fourier transform DFT on M to-be-sent data symbols, such as QAM (quadrature amplitude modulation) symbols, and outputs M symbols obtained after the DFT to a mapping unit, the mapping unit maps the M symbols obtained after the DFT to a plurality of contiguous subcarriers, and then an OFDM unit performs OFDM processing on a plurality of mapped symbols, including IFFT (inverse fast Fourier transformation), parallel-to-serial conversion, cyclic prefix addition, and the like.

For the single carrier signal, DFT is additionally performed on the signal before the OFDM processing. Therefore, due to transform characteristics of DFT and IFFT, a peak-to-average power ratio (PAPR) of an output signal remains similar to a peak-to-average power ratio of the data symbol input to the DFT unit. In addition, in a wireless communications system, the QAM symbol is input to the DFT unit, and the QAM symbol maintains a relatively low PAPR. Therefore, a signal obtained after the DFT-OFDM processing still maintains a relatively low PAPR.

When there is only one carrier, because all allocated subcarriers are contiguous, it can be ensured that a signal output after the DFT-OFDM processing has a relatively low PAPR. However, as shown in FIG. 2, during aggregation of a plurality of carriers, especially when the plurality of carriers are non-contiguous on a spectrum, a signal output by using an existing DFT-OFDM signal processing process does not maintain a low PAPR, because after the foregoing single carrier signal processing technology is used for each carrier, a relatively high PAPR is generated when a plurality of single carrier signals output by the plurality of carriers are superimposed.

Likewise, on an LTE uplink, user equipment can occupy only contiguous physical resource blocks (PRB) to perform single-carrier waveform transmission, and only the contiguous physical resource blocks can ensure a low PAPR of a single-carrier waveform. Once a plurality of PRBs allocated to the user equipment are non-contiguous, a low PAPR of an existing LTE single-carrier waveform cannot be ensured. This is also an important reason why the LTE uplink does not support allocation of non-contiguous PRBs.

Therefore, how to maintain, during aggregation of a plurality of carriers or when a plurality of allocated PRBs are con-contiguous, a relatively low PAPR of a signal obtained after the DFT-OFDM processing is a key point for current research of the wireless communications system.

SUMMARY

The present disclosure provides a signal processing method and apparatus, to maintain a relatively low PAPR of a processed DFT-OFDM signal, thereby improving wireless signal transmission reliability.

According to a first aspect, a signal processing method is provided, including:

performing discrete Fourier transform DFT on a data symbol block including M data symbols, and outputting M symbols obtained after the DFT, where the M data symbols belong to K carriers, and at least two adjacent carriers in the K carriers are non-contiguous on a spectrum; or the M data symbols belong to K physical resource blocks of one carrier, and at least two adjacent physical resource blocks in the K physical resource blocks are non-contiguous on a spectrum; mapping the M symbols obtained after the DFT to M subcarriers corresponding to inverse fast Fourier transformation IFFT; and performing N-order IFFT on a plurality of mapped symbols, where $N \geq M$ and $K \geq 2$.

With reference to the foregoing solution, M, N, and K are each a natural number, and M is greater than 1. In addition, if all the K carriers or physical resource blocks are contiguous, the foregoing solution is also applicable.

With reference to the foregoing solution, in another implementation, the K physical resource blocks may belong to one carrier, or may belong to a plurality of carriers, and the foregoing solution is also applicable, provided that the M data symbols belong to the K physical resource blocks.

In the foregoing solution, the N-order IFFT indicates that there are N input subcarrier symbols, and the M symbols obtained after the DFT occupy M input subcarrier symbols after being mapped. When N is greater than M, remaining (N−M) input subcarrier symbols may be set to 0. Therefore, the plurality of mapped symbols include the M mapped symbols and (N−M) 0s; or remaining (N−M) input subcarrier symbols may be symbols that are generated after DFT and mapping are performed on other carriers or physical resource blocks, and if there is still a remaining input subcarrier symbol, the remaining input subcarrier symbol is set to 0.

With reference to the foregoing aspect, when N is greater than M, the plurality of mapped symbols include symbols that are generated after mapping of the M symbols of the K carriers and a symbol that is generated after DFT and mapping processing are performed on a data symbol of a carrier other than the K carriers; or the plurality of mapped symbols include symbols that are generated after mapping of the M symbols of the K physical resource blocks and a symbol that is generated after DFT and mapping processing are performed on a data symbol of a physical resource block other than the K physical resource blocks.

In addition, this solution may further include: performing parallel-to-serial conversion and cyclic prefix addition on symbols obtained after the IFFT, where the IFFT, the parallel-to-serial conversion, and the cyclic prefix addition belong to an existing OFDM processing process.

Further, a filtering step may be added after OFDM processing. Specifically, filtering may be implemented by a filter after the IFFT, the parallel-to-serial conversion, or the cyclic prefix addition, to avoid out-of-band leakage of an output signal, thereby ensuring signal transmission reliability.

In addition, the filtering step may alternatively be performed after the DFT or mapping step.

With reference to the foregoing aspect, when N is greater than M, before the performing N-order IFFT on a plurality of mapped symbols, the method further includes:

setting, to 0, a subcarrier symbol that corresponds to the IFFT and to which no mapped symbol is input.

With reference to the foregoing aspect, the mapping the M symbols obtained after the DFT to M subcarriers corresponding to IFFT includes:

sequentially mapping, based on numbers of the subcarriers corresponding to the IFFT, the M symbols obtained after the DFT to M subcarriers corresponding to the IFFT.

With reference to the foregoing aspect, $M=M_1+M_2+\ldots M_k$, and $k=1, 2, \ldots,$ and K; and when the M data symbols belong to the K carriers, M is a quantity of subcarriers that are of the K carriers and that are used for data transmission, and $M_k$ is a quantity of subcarriers of a $k^{th}$ carrier that are used for data transmission; or when the M data symbols belong to the K physical resource blocks of one carrier, M is a quantity of subcarriers occupied by the K physical resource blocks for data transmission, and $M_k$ is a quantity of subcarriers occupied by a $k^{th}$ physical resource block for data transmission.

With reference to the foregoing aspect, the M symbols obtained after the DFT are $(D[1], D[2], \ldots,$ and $D[M])$, and the step of mapping specifically includes:

for a first carrier or physical resource block, $X[i_1]=D[1]$, $X[i_1+1]=D[2], \ldots,$ and $X[i_1+M_1-1]=D[M_1]$;

for a second carrier or physical resource block, $X[i_2]=D[M_1+1]$, $X[i_2+1]=D[M_1+2], \ldots,$ and $X[i_2+M_2-1]=D[M_1+M_2]$;

. . .

for a $K^{th}$ carrier or physical resource block, $X[i_K]=D[M_1+M_2+\ldots+M_{k-1}+1]$, $X[i_K+1]=D[M_1+M_2+\ldots+M_{k-1}+2], \ldots,$ and $X[i_K+M_K-1]=D[M_1+M_2+\ldots+M_k]$; and if m is not included in the numbers $\{i_k, i_k+1, \ldots,$ and $i_k+M_k-1,$ where $k=1, 2, \ldots,$ and K$\}$, $X[m]=0$, where $X[m]$ is an input subcarrier symbol corresponding to the IFFT, and $m=1, 2, \ldots,$ and N;

subcarriers of the N-order IFFT are numbered as $1, 2, \ldots,$ and N; and subcarriers of the $K^{th}$ carrier or physical resource block corresponding to the IFFT are numbered as $i_k, i_k+1, \ldots,$ and $i_k+M_k-1,$ where $k=1, 2, \ldots,$ and K.

In the foregoing solution, a symbol of the first carrier or physical resource block is first mapped, and then a symbol of the second carrier or physical resource block is mapped, until a symbol of the $K^{th}$ carrier or physical resource block is mapped.

With reference to the foregoing aspect, $M=2^Q$, and Q is a natural number. PAPR performance can be further improved.

With reference to the foregoing aspect, the method further includes: sending subcarrier configuration information corresponding to the IFFT to a receive end, so that the receive end detects a DFT-OFDM signal based on a configuration information of the subcarriers. In addition, the configuration information of the subcarriers may be sent in advance, or may be sent after the DFT or mapping step. The receive end needs to receive corresponding subcarrier configuration information before demodulating a signal, and specific time at which a transmit end sends the subcarrier configuration information is not limited.

There are M pieces of subcarrier configuration information. The subcarrier configuration information may further include the subcarrier numbers $(i_k, i_k+1, \ldots,$ and $i_k+M_k-1)$ corresponding to the IFFT; or the subcarrier configuration information includes only numbers $(i_k, i_k+1, \ldots,$ and $i_k+M_k-1)$ of subcarriers occupied on each carrier. The subcarrier configuration information is sent to the receive end, so that the receive end may obtain a value of M based on a quantity of the numbers. In addition, there may be another manner. For details, refer to specific embodiments.

According to a second aspect, a signal processing apparatus is provided, including:

a discrete Fourier transform DFT module, configured to: perform discrete Fourier transform DFT on a data symbol block including M data symbols, and output M symbols obtained after the DFT, where the M data symbols belong to K carriers, and at least two adjacent carriers in the K carriers are non-contiguous on a spectrum; or the M data symbols belong to K physical resource blocks of one carrier, and at least two adjacent physical resource blocks in the K physical resource blocks are non-contiguous on a spectrum;

a mapping module, configured to map the M symbols obtained after the DFT to M subcarriers corresponding to inverse fast Fourier transformation IFFT; and an IFFT module, configured to perform N-order IFFT on a plurality of mapped symbols, where $N \geq M$ and $K \geq 2$.

The apparatus corresponds to the foregoing method, and corresponding modules perform corresponding steps. Specifically, the steps may be performed by a network-side network element such as an AP or a base station, or may be performed by user equipment, for example, a mobile terminal such as a mobile phone or a notebook computer.

In addition, this solution may further include: performing parallel-to-serial conversion and cyclic prefix addition on symbols obtained after the IFFT, where the IFFT, the parallel-to-serial conversion, and the cyclic prefix addition belong to an existing OFDM processing process. Specifically, parallel-to-serial conversion and cyclic prefix addition may be completed by a parallel-to-serial conversion module and a cyclic prefix addition module, or may be completed by the IFFT module. The IFFT module, the parallel-to-serial conversion module, and the cyclic prefix addition module may be collectively referred to as an OFDM module, and the foregoing process is entirely completed by the OFDM module.

In the foregoing solution, a filter or a filtering module may be added after the OFDM module or between the DFT module and the mapping module or between the mapping module and the IFFT module, to filter a signal or a symbol output by a corresponding module, and avoid out-of-band leakage of the output signal.

With reference to the foregoing second aspect, when N is greater than M, the plurality of mapped symbols include symbols that are generated after mapping of the M symbols of the K carriers and a symbol that is generated after DFT and mapping processing are performed on a data symbol of a carrier other than the K carriers; or the plurality of mapped symbols include symbols that are generated after mapping of the M symbols of the K physical resource blocks and a symbol that is generated after DFT and mapping processing are performed on a data symbol of a physical resource block other than the K physical resource blocks.

With reference to the foregoing aspect, when N is greater than M, the IFFT module is further configured to set, to 0, a subcarrier symbol to which no mapped symbol is input.

With reference to the foregoing aspect, the mapping module is specifically configured to:

sequentially map, based on numbers of subcarriers corresponding to the IFFT module, the M symbols obtained after the DFT to M subcarriers corresponding to the IFFT module.

With reference to the foregoing aspect, $M=M_1+M_2+ \ldots M_k$, and $k=1, 2, \ldots,$ and K; and when the M data symbols belong to the K carriers, M is a quantity of subcarriers that are of the K carriers and that are used for data transmission, and $M_k$ is a quantity of subcarriers of a $k^{th}$ carrier that are used for data transmission; or when the M data symbols belong to the K physical resource blocks of one carrier, M is a quantity of subcarriers occupied by the K physical resource blocks for data transmission, and $M_k$ is a quantity of subcarriers occupied by a $k^{th}$ physical resource block for data transmission.

With reference to the foregoing aspect, the M symbols obtained after the DFT are (D[1], D[2], . . . , and D[M]), and a mapping process specifically includes:

for a first carrier or physical resource block, $X[i_1]=D[1]$, $X[i_1+1]=D[2], \ldots,$ and $X[i_1+M_1-1]=D[M_1]$;

for a second carrier or physical resource block, $X[i_2]=D[M_1+1]$, $X[i_2+1]=D[M_1+2], \ldots,$ and $X[i_2+M_2-1]=D[M_1+M_2]$;

. . .

for a $K^{th}$ carrier or physical resource block, $X[i_K]=D[M_1+M_2+ \ldots +M_{K-1}+1]$, $X[i_K+1]=D[M_1+M_2+ \ldots +M_{K-1}+2], \ldots,$ and $X[i_K+M_K-1]=D[M_1+M_2+ \ldots +M_K]$; and if m is not included in the numbers $\{i_k, i_k+1, \ldots,$ and $i_k+M_k-1$, where $k=1, 2, \ldots,$ and $K\}$, $X[m]=0$, where X[m] is an input subcarrier symbol corresponding to the IFFT module, and $m=1, 2, \ldots,$ and N;

subcarriers of the N-order IFFT are numbered as 1, 2, . . . , and N; and subcarriers of the $K^{th}$ carrier or physical resource block corresponding to the IFFT are numbered as $i_k, i_k+1, \ldots,$ and $i_k+M_k-1$, where $k=1, 2, \ldots,$ and K.

With reference to the foregoing aspect, $M=2^Q$, and Q is a natural number.

With reference to the foregoing aspect, the apparatus further includes a sending module, configured to send subcarrier configuration information corresponding to the IFFT to a receive end.

With reference to the foregoing aspect, the apparatus further includes a filtering module, configured to filter the symbol output by the DFT module, the symbol mapped by the mapping module, or a signal output by the IFFT module.

It may be understood that the foregoing modules may be replaced with corresponding units.

According to a third aspect, a signal processing apparatus is disclosed, including: a processor, configured to:

perform discrete Fourier transform DFT on a data symbol block including M data symbols, and output M symbols obtained after the DFT, where the M data symbols belong to K carriers, and at least two adjacent carriers in the K carriers are non-contiguous on a spectrum; or the M data symbols belong to K physical resource blocks of one carrier, and at least two adjacent physical resource blocks in the K physical resource blocks are non-contiguous on a spectrum;

map the M symbols obtained after the DFT to M subcarriers corresponding to inverse fast Fourier transformation IFFT; and perform N-order IFFT on a plurality of mapped symbols, where N≥M and K≥2.

With reference to the third aspect, the apparatus further includes a transceiver, configured to send subcarrier configuration information corresponding to the IFFT to a receive end.

With reference to the third aspect, the apparatus further includes a filter, configured to filter the symbol obtained after the DFT, the mapped symbol, or a signal output after the IFFT.

The signal output after the IFFT may alternatively be a signal obtained after OFDM processing. The OFDM processing includes the IFFT, and may further include parallel-to-serial conversion and cyclic prefix addition.

According to the signal processing method and apparatus provided in the present disclosure, discrete Fourier transform DFT and mapping processing are performed on a data symbol block including data symbols of non-contiguous carriers or physical resource blocks, and then IFFT is performed, so that a relatively low PAPR of a processed DFT-OFDM signal is maintained, thereby improving wireless signal transmission reliability.

BRIEF DESCRIPTION OF DRAWINGS

To describe the technical solutions in the embodiments of the present disclosure more clearly, the following briefly describes the accompanying drawings correspondingly required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The embodiments of the present disclosure may be used for various OFDM technology-based wireless networks. A radio access network may include different network elements in different systems. For example, network elements of the radio access network in LTE (Long Term Evolution) and LTE-A (LTE Advanced) include an eNB (evolved NodeB), and network elements in a WLAN (wireless local area network)/Wi-Fi include an access point (AP) and the like. Solutions similar to those in the embodiments of the present disclosure may also be used in another wireless network, and only related modules in a base station system may be different. The embodiments of the present disclosure impose no limitation.

It should be further understood that in the embodiments of the present disclosure, user equipment (UE) includes but is not limited to a mobile station (MS), a mobile terminal, a mobile telephone, a handset, portable equipment, and the like. The user equipment may communicate with one or more core networks by using a radio access network (RAN). For example, the user equipment may be a mobile telephone (or referred to as a "cellular" telephone), or a computer having a wireless communication function; or the user equipment may be a portable, pocket-sized, handheld, computer built-in, or in-vehicle mobile apparatus.

An LTE system allows carrier aggregation of a plurality of carriers, and a maximum of eight carriers can participate in carrier aggregation. A bandwidth of each carrier may be 1.4 MHz, 5 MHz, 10 MHz, or 20 MHz, and different bandwidths may be combined at random. On an LTE uplink, each user equipment may occupy one PRB (physical resource block) of a carrier or a plurality of PRBs of a carrier that are contiguous on a spectrum to transmit data. Each PRB includes 12 contiguous subcarriers, and 14 OFDM symbol lengths in terms of time, namely, a time length of 1 ms.

Any OFDM symbol length is used as an example to describe a single carrier signal (namely, a DFT-OFDM signal) processing process in a carrier aggregation scenario, for example, during LTE carrier aggregation.

Figure 3:
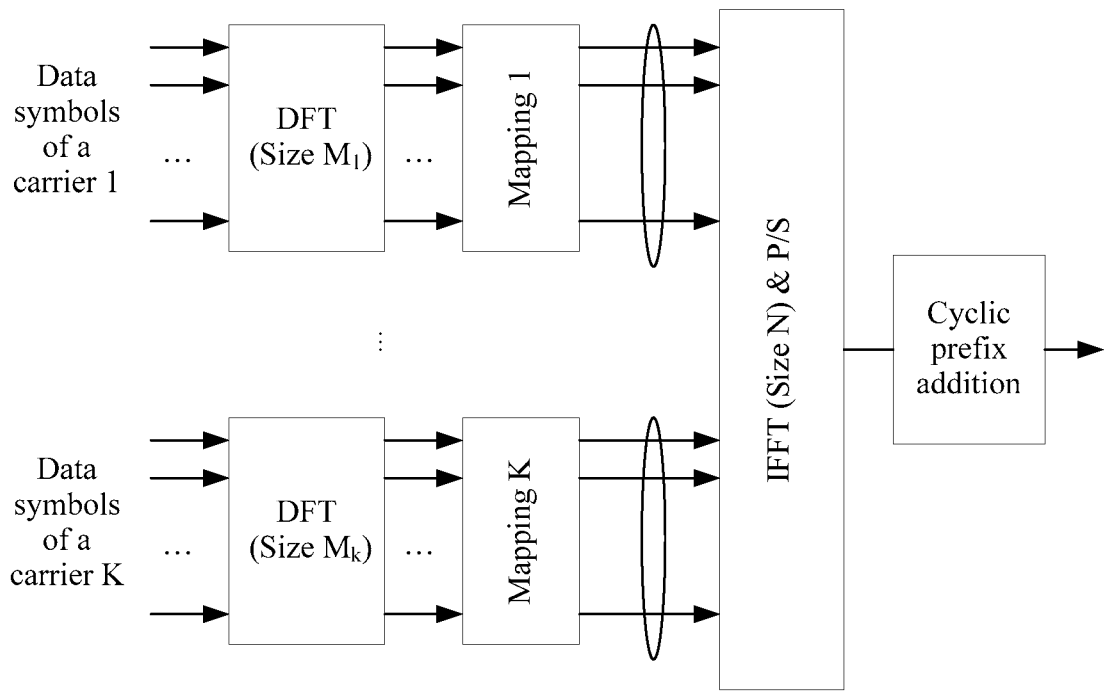
FIG. 3 is a schematic flowchart of a conventional DFT-OFDM signal processing method in carrier aggregation.

In the carrier aggregation scenario, it is assumed that K carriers are aggregated, and $M_k$ data symbols are input to a $k^{th}$ carrier, where k=1, 2, . . . , and K. For example, $M_k$ is an integer multiple of 12 in LTE. The single carrier signal (namely, the DFT-OFDM signal) processing process is mainly to separately perform DFT and mapping processing on data symbols of each carrier. There may be one or more data symbols on each carrier. Usually, there are a plurality of data symbols on each carrier. Referring to FIG. 3, data symbols of each carrier correspond to one DFT unit and one mapping unit, and there are a total of K DFT units and K mapping units; and mapped symbols of all the carriers access a same IFFT unit for IFFT. Therefore, DFT and mapping processing are separately performed on the data symbols of each carrier, and then OFDM processing is performed on the mapped symbols of the carriers. The method includes the following steps.

101. Perform DFT on data symbols of carriers, and separately output symbols that are of the carriers and that are obtained after the DFT.

A $k^{th}$ carrier is used as an example. First, a DFT unit of the $k^{th}$ carrier performs DFT on $M_k$ input data symbols, and outputs $M_k$ symbols obtained after the DFT, where k=1, 2, . . . , and K. Therefore, after data symbols of K carriers are separately processed by K DFT units, K groups of symbols obtained after the DFT processing are output.

102. Separately map the symbols that are of the carriers and that are obtained after the DFT processing to subcarrier symbols of IFFT.

A mapping unit of the $k^{th}$ carrier maps the $M_k$ symbols obtained after the DFT to the subcarrier symbols corresponding to the IFFT, and outputs $M_k$ mapped symbols, where k=1, 2, . . . , and K. Therefore, K symbols obtained after the DFT are separately mapped by K mapping units, and M symbols mapped by the K mapping units are jointly input to one IFFT unit. In this way, a total of M input symbols in the IFFT unit are the M mapped symbols, where $M=M_1+M_2+\ldots+M_k$.

103. Perform IFFT on the mapped symbols.

The IFFT is a part of the OFDM processing, and the OFDM processing may further include parallel-to-serial conversion, cyclic prefix addition, and the like.

The mapped symbols of the carriers are collectively input to one IFFT unit for N-order IFFT processing. Therefore, the IFFT unit has N input symbols, where N≥M. If N=M, the IFFT unit directly performs IFFT on the M mapped symbols.

When N is greater than M, no mapped symbol is input to a total of N–M input symbols in the N input symbols corresponding to the IFFT unit, and all the N–M input symbols may be set to 0 and serve as input symbols of corresponding subcarriers. Finally, N-order OFDM signal processing including N-order IFFT, parallel-to-serial conversion, and cyclic prefix addition is performed on a total of N symbols: the input M mapped symbols and the N–M 0s. OFDM signal processing is common in the prior art, and is not described in detail.

Likewise, an IEEE802.11ay system also allows carrier aggregation of a plurality of carriers, and a maximum of four carriers can participate in carrier aggregation. A bandwidth of each carrier is fixed to 2.16 GHz, and four carriers are contiguous on a spectrum. A difference from the foregoing LTE uplink lies in that the bandwidth of each carrier is fixed to 2.16 GHz, and a same data symbol is input to each carrier. In other words, in the foregoing method, $M_1=M_2=\ldots=M_k=355$. On an IEEE802.11 ay link, each user equipment may occupy one or more carriers, and the user equipment occupies all subcarriers except a guard subcarrier on the occupied carriers. The method shown in FIG. 3 is also applicable to a signal generation process of IEEE802.11ay in carrier aggregation, and differs from LTE only in parameter configuration.

In the foregoing signal processing method in carrier aggregation, DFT is independently performed on an input data symbol on each carrier, a plurality of DFTs are performed for a plurality of carriers, symbols that are of a plurality of carriers and that are obtained after the DFT are separately mapped, and IFFT is performed on the mapped symbols. When a plurality of DFTs are performed in combination with the IFFT, a PAPR of an output DFT-OFDM signal increases. For example, when there are four or more carriers, the PAPR is increased by 1.5 dB or more.

This embodiment of the present disclosure is to be further improved from the following two points, to reduce a PAPR of a DFT-OFDM signal during carrier aggregation, thereby improving signal transmission reliability.

(1) Perform DFT on data symbols of a plurality of carriers.

(2) Collectively map a plurality of symbols output by a DFT unit.

A same signal generation method is used in all OFDM symbol periods, and signal generation in one OFDM symbol period may be used as an example for description.

Figure 4:
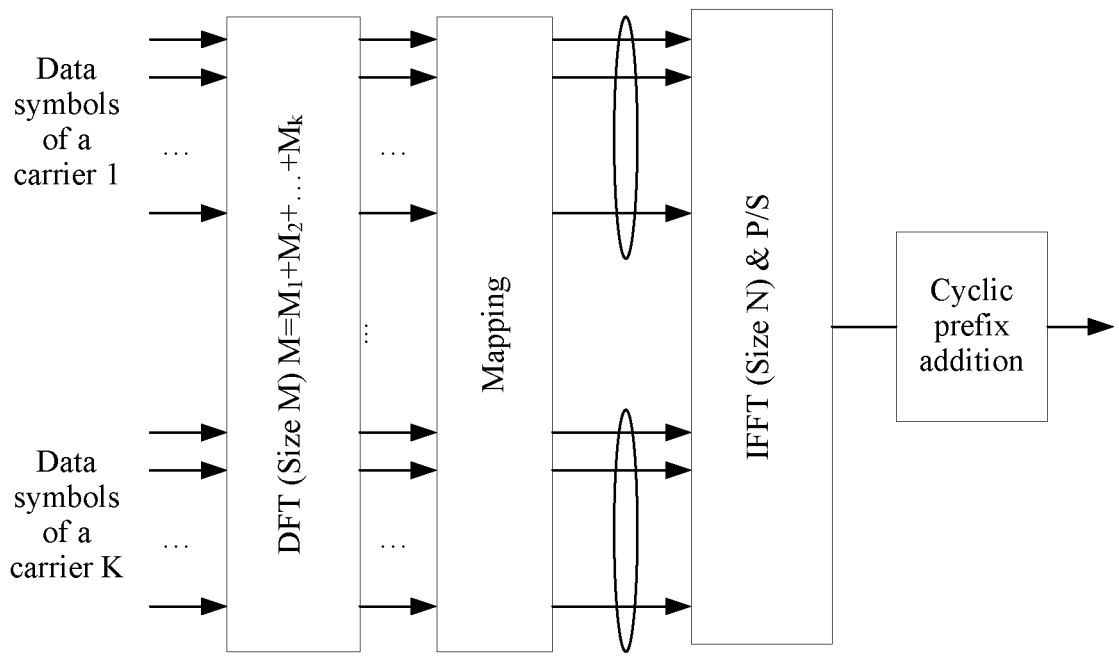
FIG. 4 is a schematic flowchart of a DFT-OFDM signal processing method according to an embodiment of the present disclosure.

It is assumed that there are K carriers, where K is a natural number greater than 1, and at least two adjacent carriers are non-contiguous on a spectrum. Each carrier includes $M_k$ subcarriers for data transmission, and the K carriers have a total of M subcarriers for data transmission, where k=1, 2, ..., and K, and $M=M_1+M_2+ \ldots M_k$. During OFDM processing, N-order IFFT is performed, and subcarriers are numbered as 1, 2, ..., and N, where N≥M. It is assumed that subcarriers used for data transmission in IFFT are numbered as $i_k$, $i_k+1$, ..., and $i_k+M_k-1$, where k=1, 2, ..., and K. Referring to FIG. 4, a signal processing method in this embodiment includes the following steps.

201. Perform DFT on a data symbol block including M data symbols of the K carriers, and output M symbols obtained after the DFT.

The data symbol block includes the M data symbols, and the M data symbols may be all or some data symbols of the K carriers. Herein, the data symbols ($d_k[1]$, $d_k[2]$, ..., and $d_k[M_k]$, where k=1, 2, ..., and K) belong to the K carriers, and $d_k[m]$ indicates an $m^{th}$ data symbol to be transmitted on a $k^{th}$ carrier.

The data symbol block including the M data symbols is input to one DFT unit for DFT, and the M symbols obtained after the DFT are output and denoted as (D[1], D[2], ..., and D[M]). M is equal to a sum of quantities of subcarriers that are used for data transmission on the K carriers, in other words, $M=M_1+M_2+ \ldots M_k$. For example, a value of M is $2^Q$, and Q is a natural number. PAPR performance can be further improved.

202. Map the M symbols that are output by a DFT unit after the DFT to M subcarriers corresponding to IFFT.

The M symbols (D[1], D[2], ..., and D[M]) output by the DFT unit after the DFT are input to one mapping unit, and the mapping unit collectively maps the M symbols obtained after the DFT to the M subcarriers, and outputs the M mapped symbols as input symbols corresponding to the IFFT unit. If the IFFT unit is an N-order unit, in other words, if the IFFT unit has N inputs, where N≥M, when N is greater than M, the IFFT unit has N input symbols, and all N−M input symbols that are in the IFFT unit and to which no mapped symbol is input are set to 0.

A specific mapping process of the mapping unit is as follows:

for a first carrier, $X[i_1]=D[1]$, $X[i_1+1]=D[2]$, ..., and $X[i_1+M_1-1]=D[M_1]$;

for a second carrier, $X[i_2]=D[M_1+1]$, $X[i_2+1]=D[M_1+2]$, ..., and $X[i_2+M_2-1]=D[M_1+M_2]$;

...

for a $K^{th}$ carrier, $X[i_K]=D[M_1+M_2+ \ldots +M_{k-1}+1]$, $X[i_K+1]=D[M_1+M_2+ \ldots +M_{k-1}+2]$, ..., and $X[i_K+M_k-1]=D[M_1+M_2+ \ldots +M_k]$; and if m is not included in the numbers $\{i_k, i_k+1, \ldots,$ and $i_k+M_k-1$, where k=1, 2, ..., and K$\}$, X[m]=0, where $\{X[m], m=1, 2, \ldots,$ and N$\}$ is an input symbol corresponding to the IFFT unit;

subcarriers of the N-order IFFT unit are numbered as 1, 2, ..., and N; and the subcarriers corresponding to the IFFT unit are numbered as $i_k$, $i_k+1$, ..., and $i_k+M_k-1$, where k=1, 2, ..., and K.

In the foregoing mapping method, specifically, the M symbols obtained after the DFT are sequentially mapped to M subcarriers corresponding to the IFFT based on numbers of the subcarriers corresponding to the IFFT unit. For example, symbols on the first carrier are first mapped based on numbers of subcarriers to which the symbols belong, and then symbols on the second carrier are mapped based on numbers of subcarriers to which the symbols belong, until symbols on the $K^{th}$ carrier are mapped.

203. Perform N-order IFFT on a plurality of mapped symbols.

N mapped symbols (X[1], X[2], ..., and X[N]) are performed with N-order IFFT, and may be further performed with parallel-to-serial conversion and cyclic prefix addition. The IFFT, the parallel-to-serial conversion, and the cyclic prefix addition belong to an existing OFDM processing technology, and are not described in detail. Corresponding operations may be performed by an existing IFFT unit, parallel-to-serial conversion unit, and cyclic prefix addition unit. It should be noted that an added cyclic prefix may be an all-0 cyclic prefix that is also applicable to this embodiment of the present disclosure. Another processing method that can be used to replace the cyclic prefix addition is pseudo random sequence addition. To be specific, a prefix part is a pseudo random sequence that is also applicable to this embodiment of the present disclosure.

It should be noted that if all the K carriers are contiguous, the foregoing method is also applicable.

In the solution of this embodiment of the present disclosure, DFT is performed on the M data symbols from a plurality of carriers, and a DFT order M is equal to a sum of quantities of subcarriers that are of all the carriers and that are used for data transmission. Therefore, there is only one DFT unit in a schematic flowchart of FIG. 4. During conventional carrier aggregation, a DFT-OFDM signal processing method is to independently perform DFT on a data symbol of each carrier. For example, in a schematic flowchart of FIG. 3, if there are K carriers, there are K DFT units, and a DFT order of each carrier is a quantity of subcarriers of the carrier that are used for data transmission. In addition, in this embodiment of the present disclosure, the symbols obtained after the DFT are collectively mapped by one mapping unit. In other words, the M symbols output by the DFT unit are collectively mapped to the M subcarriers corresponding to the IFFT. As shown in FIG. 4, there is only one mapping unit. In a conventional solution, one mapping unit is configured for each carrier, and maps a plurality of symbols on the carrier that are obtained after the DFT to a plurality of subcarriers of IFFT. In the schematic flowchart of FIG. 3, if there are K carriers, a total of K mapping units are needed.

In another embodiment, if a plurality of physical resource blocks PRBs on one carrier are allocated for data transmission, and at least two adjacent physical resource blocks are non-contiguous on a spectrum, the present disclosure is also applicable. If a plurality of non-contiguous PRBs on one carrier are allocated, this embodiment of the present disclosure may be further improved from the following two points, to reduce a PAPR of a DFT-OFDM signal, and support transmission of the plurality of non-contiguous PRBs.

(1) Perform DFT on data symbols of a plurality of non-contiguous PRBs on one carrier.

(2) Collectively map a plurality of symbols output by a DFT unit.

A same signal generation method is used in all OFDM symbol periods, and signal generation in one OFDM symbol period may be used as an example for description.

It is assumed that K physical resource blocks are allocated, where K is a natural number greater than 1, and at least two adjacent physical resource blocks are non-contiguous on a spectrum. $M_k$ subcarriers are allocated to each physical resource block for data transmission, and the K physical resource blocks occupy a total of M subcarriers for data transmission, where k=1, 2, . . . , and K, and M=$M_1$+$M_2$+ . . . $M_k$.

Figure 5:
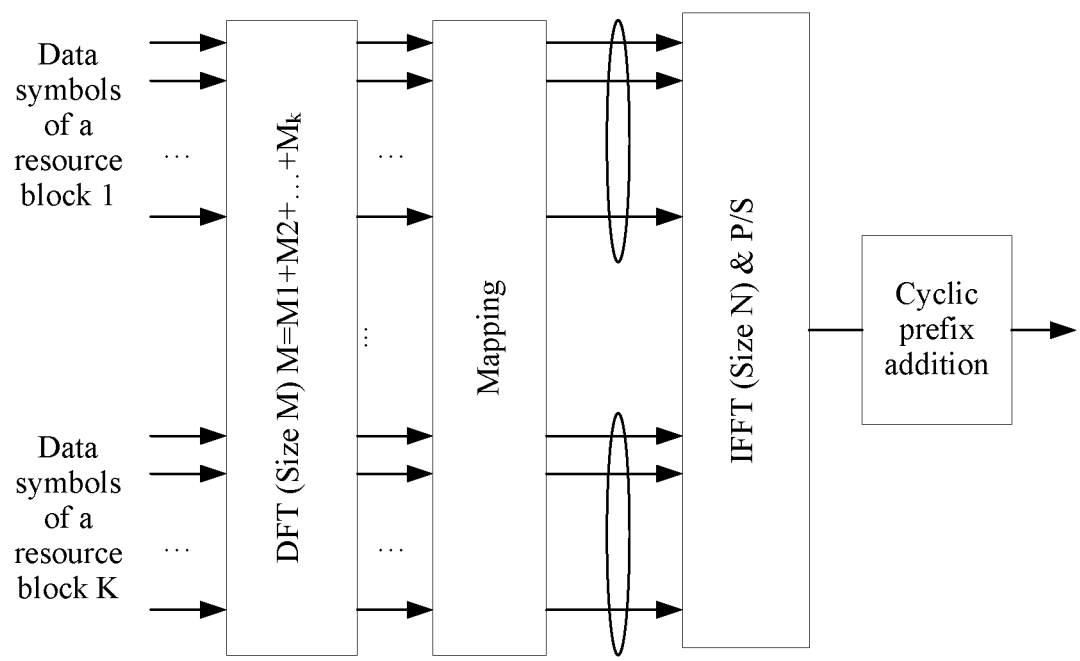
FIG. 5 is a schematic flowchart of a DFT-OFDM signal processing method according to another embodiment of the present disclosure.

During OFDM processing, N-order IFFT is performed, and subcarriers are numbered as 1, 2, . . . , and N, where N≥M. It is assumed that subcarriers used for data transmission in IFFT are numbered as $i_k$, $i_k$+1, . . . , and $i_k$+$M_k$−1, where k=1, 2, . . . , and K. Referring to FIG. 5, a signal processing method in this embodiment includes the following steps.

301. Perform DFT on a data symbol block including M data symbols of the K physical resource blocks, and output M symbols obtained after the DFT.

The data symbol block includes the M data symbols. Herein, the data symbols ($d_k$ [1], $d_k$ [2], . . . , and $d_k$ [$M_k$], where k=1, 2, . . . , and K) belong to the K physical resource blocks and may be all or some data symbols of the K physical resource blocks, where $d_k$ [m] indicates an $m^{th}$ data symbol to be transmitted on a $k^{th}$ physical resource block.

The data symbol block is collectively input to one DFT unit for DFT, and the M symbols obtained after the DFT are output and denoted as (D[1], D[2], . . . , and D[M]). M is equal to a sum of quantities of subcarriers used by the K physical resource blocks for data transmission, in other words, M=$M_1$+$M_2$+ . . . $M_k$. For example, a value of M is $2^Q$, and Q is a natural number. PAPR performance can be further improved.

302. Map the M symbols that are output by a DFT unit after the DFT to M subcarriers corresponding to IFFT.

The M symbols (D[1], D[2], . . . , and D[M]) output by the DFT unit after the DFT are input to one mapping unit, and the mapping unit collectively maps the M symbols obtained after the DFT to the M subcarriers, and outputs the M mapped symbols as input symbols corresponding to the IFFT unit. If the IFFT unit is an N-order unit, in other words, if the IFFT unit has N inputs, where N≥M, when N is greater than M, the IFFT unit has N input symbols, and all N−M input symbols that are in the IFFT unit and to which no mapped symbol is input are set to 0.

A specific mapping process of the mapping unit is as follows:

for a first PRB, X[$i_1$]=D[1], X[$i_1$+1]=D[2], . . . , and X[$i_1$+$M_1$−1]=D[$M_1$];

for a second PRB, X[$i_2$]=D[$M_1$+1], X[$i_2$+1]=D[$M_1$+2], . . . , and X[$i_2$+$M_2$−1]=D[$M_1$+$M_2$];

. . .

for a $K^{th}$ PRB, X[$i_K$]=D[$M_1$+$M_2$+ . . . +$M_{k-1}$+1], X[$i_K$+1]=D[$M_1$+$M_2$+ . . . +$M_{k-1}$+2], . . . , and X[$i_K$+$M_K$−1]=D[$M_1$+$M_2$+ . . . +$M_k$]; and if m is not included in the numbers {$i_k$, $i_k$+1, . . . , and $i_k$+$M_k$−1, where k=1, 2, . . . , and K}, X[m]=0, where {X[m], m=1, 2, . . . , and N} is an input symbol corresponding to the IFFT unit;

subcarriers of the N-order IFFT unit are numbered as 1, 2, . . . , and N; and the subcarriers corresponding to the IFFT unit are numbered as $i_k$, $i_k$+1, . . . , and $i_k$+$M_k$−1, where k=1, 2, . . . , and K.

In the foregoing mapping method, specifically, the M symbols obtained after the DFT are sequentially mapped to M subcarriers corresponding to the IFFT based on numbers of the subcarriers corresponding to the IFFT unit. For example, symbols on the first PRB are first mapped based on numbers of subcarriers to which the symbols belong, and then symbols on the second PRB are mapped based on numbers of subcarriers to which the symbols belong, until symbols on the $K^{th}$ PRB are mapped.

303. Perform N-order IFFT on a plurality of mapped symbols.

N-order IFFT is performed on N mapped symbols (X[1], X[2], . . . , and X[N]), and may further include parallel-to-serial conversion and cyclic prefix addition. The IFFT, the parallel-to-serial conversion, and the cyclic prefix addition belong to an existing OFDM processing technology, and are not described in detail. Corresponding operations may be performed by an existing IFFT unit, parallel-to-serial conversion unit, and cyclic prefix addition unit. It should be noted that an added cyclic prefix may be an all-0 cyclic prefix, in other words, a prefix part does not send any signal. Such an OFDM processing method with a prefix of 0 belongs to the prior art, and is also applicable to this embodiment of the present disclosure. Another processing method that can be used to replace the cyclic prefix addition is pseudo random sequence addition. To be specific, a prefix part is a pseudo random sequence that is also applicable to this embodiment of the present disclosure.

It should be noted that if all the K physical resource blocks are contiguous, the foregoing method is also applicable. Further, the K physical resource blocks in the foregoing embodiment belong to one carrier, and if the K physical resource blocks belong to a plurality of carriers, this solution is also applicable.

Figure 6:
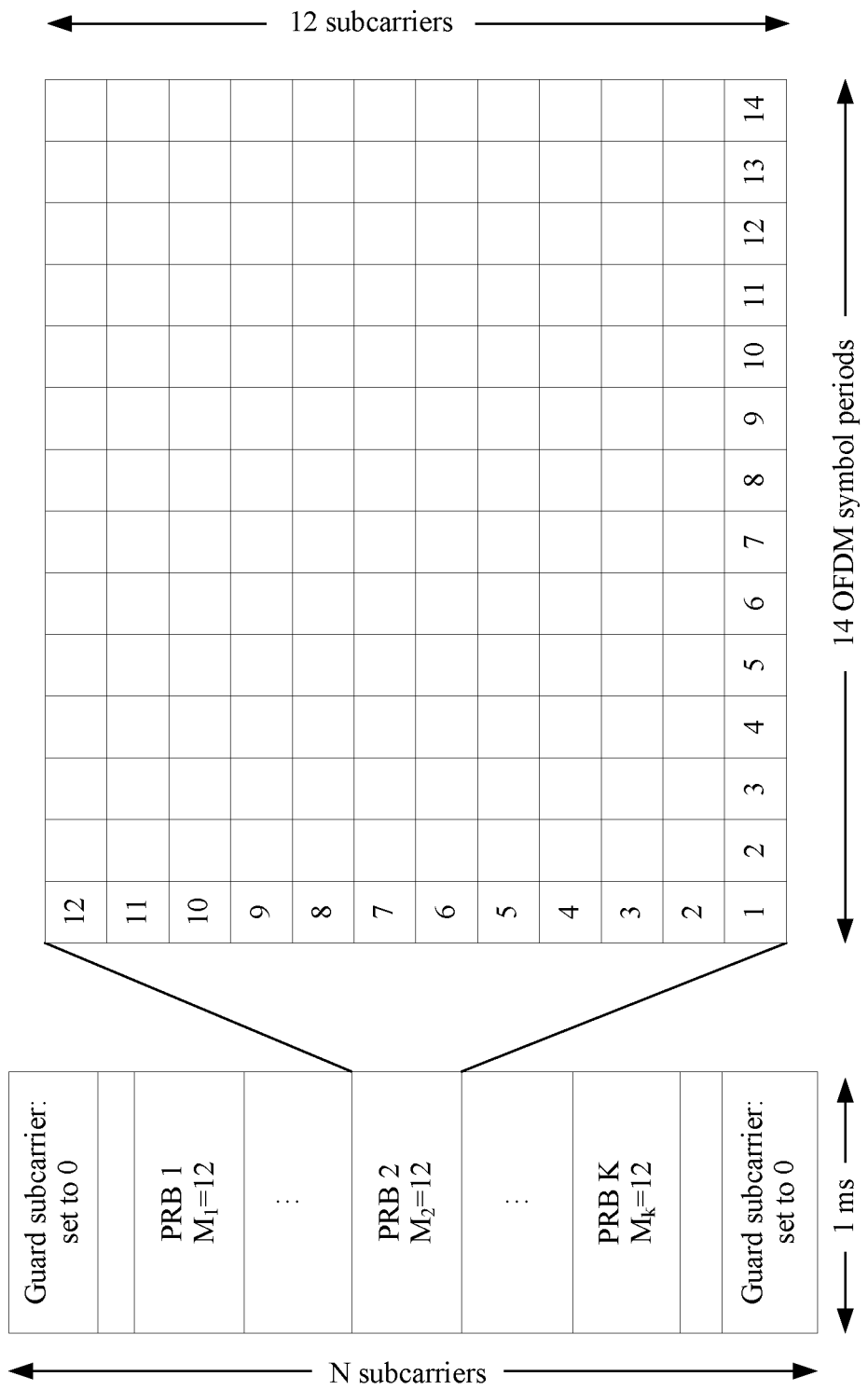
FIG. 6 is a schematic diagram of using a plurality of resource blocks on one carrier in an LTE system.

The foregoing embodiment is applicable to an LTE uplink. As shown in FIG. 6, if a plurality of PRBs are allocated to particular user equipment, and each PRB occupies 12 subcarriers, $M_1$=$M_2$= . . . =$M_k$=12, where K is a quantity of scheduled PRBs. N is an IFFT order for one carrier in LTE. For a guard subcarrier and an unscheduled PRB, there are a total of N−M subcarriers, and all the N−M subcarriers are set to 0.

In the solution of this embodiment of the present disclosure, DFT is performed on M data symbols from a plurality of PRBs, and a DFT order M is equal to a sum of quantities of subcarriers used by all the PRBs for data transmission. Therefore, there is only one DFT unit in a schematic flowchart of FIG. 5. A conventional DFT-OFDM signal processing method in which a plurality of PRBs are occupied is to independently perform DFT on a data symbol of each PRB. If there are K PRBs, there are K DFT units, and a DFT order of each PRB is a quantity of subcarriers used by the PRB for data transmission. In addition, in this embodiment of the present disclosure, the symbols obtained after the DFT are collectively mapped by one mapping unit. In other words, the M symbols output by the DFT unit are collectively mapped to the M subcarriers corresponding to the IFFT. As shown in FIG. 5, there is only one mapping unit. In a conventional solution, one mapping unit is configured for each PRB, and maps a plurality of symbols on the PRB that are obtained after the DFT to a plurality of subcarriers of IFFT. If there are K PRBs, a total of K mapping units are needed.

In the foregoing embodiments, the DFT order M varies with a total quantity of subcarriers allocated at each time, and a total quantity of subcarriers allocated at different times may be different. The DFT order M varies with time correspondingly. In other words, the DFT order may be dynamically adjusted.

The embodiments of the present disclosure are applicable to a wireless communications system such as a 5G wireless communications system, an LTE evolution system, and an IEEE802.11ay system. The embodiments of the present disclosure are also applicable to microwave transmission. When a plurality of carriers are used for microwave transmission, and at least two adjacent carriers are non-contiguous on a spectrum, the embodiments of the present disclosure are also applicable, and the embodiments of the present disclosure are also applicable to high frequency transmission of 6 GHz or higher. During aggregation of a plurality of carriers, a PAPR can be significantly reduced by using the method and apparatus in the embodiments of the present disclosure, thereby improving radio frequency use efficiency.

Figure 7:
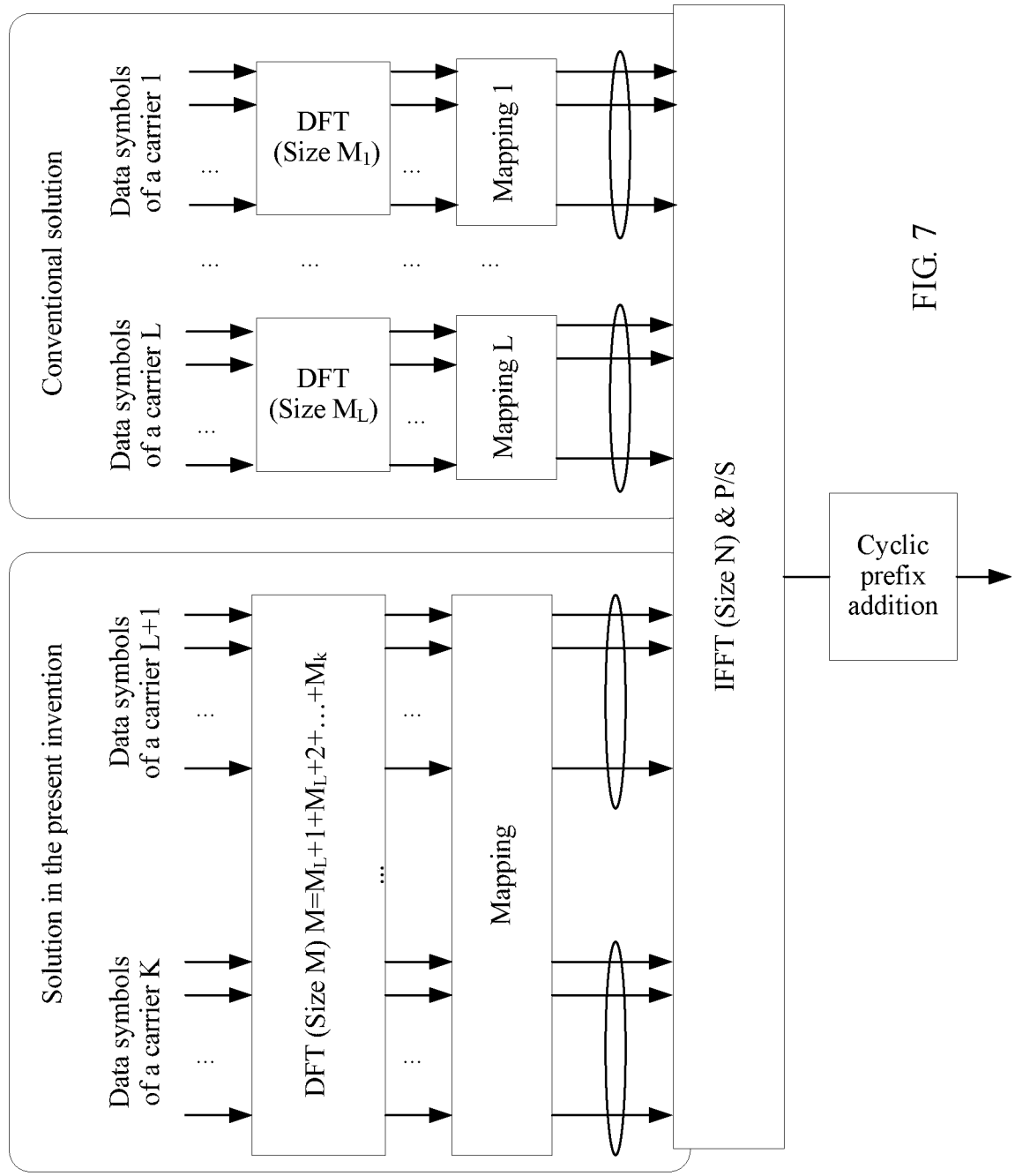
FIG. 7 is a schematic flowchart of a DFT-OFDM signal processing method according to still another embodiment of the present disclosure.

The solutions in the foregoing embodiments may be used in combination with a conventional technical solution of single carrier signal processing. For example, K carriers are used for data transmission. A solution in FIG. 3 may be used for data of L carriers, and a solution in FIG. 4 is used for data of remaining K−L carriers; and a combined solution is shown in FIG. 7. It is assumed that $M'=M_1+M_2+\ldots+M_L$ mapped symbols are output after data symbols of the L carriers that use the solution in FIG. 3 are processed by L DFT units and L mapping units corresponding to the L carriers. It is assumed that $M=M_{L+1}+M_{L+2}+\ldots+M_K$ mapped symbols are output after data symbols of the K−L carriers that use the solution in FIG. 4 are uniformly processed by one DFT unit and one mapping unit. Finally, the M'+M mapped symbols are collectively input to an IFFT unit for IFFT. If the IFFT unit is an N-order unit, where N≥M, when N is greater than M, all N−(M'+M) subcarrier symbols to which no mapped symbol is input are set to 0. The L carriers that use the solution in FIG. 3 may be primary carriers, for example, L=1; and the remaining K−L carriers that use the solution in FIG. 4 are secondary carriers that are used to improve a data rate.

It may be understood that the embodiment shown in FIG. 7 is also applicable when there are a plurality of physical resource blocks. For example, K physical resource blocks are used for data transmission, where the conventional solution may be used for data of L physical resource blocks, and a solution in FIG. 5 is used for data of remaining K−L physical resource blocks. Specific implementation is similar to that of the foregoing embodiment, and is not described in detail.

Figure 8:
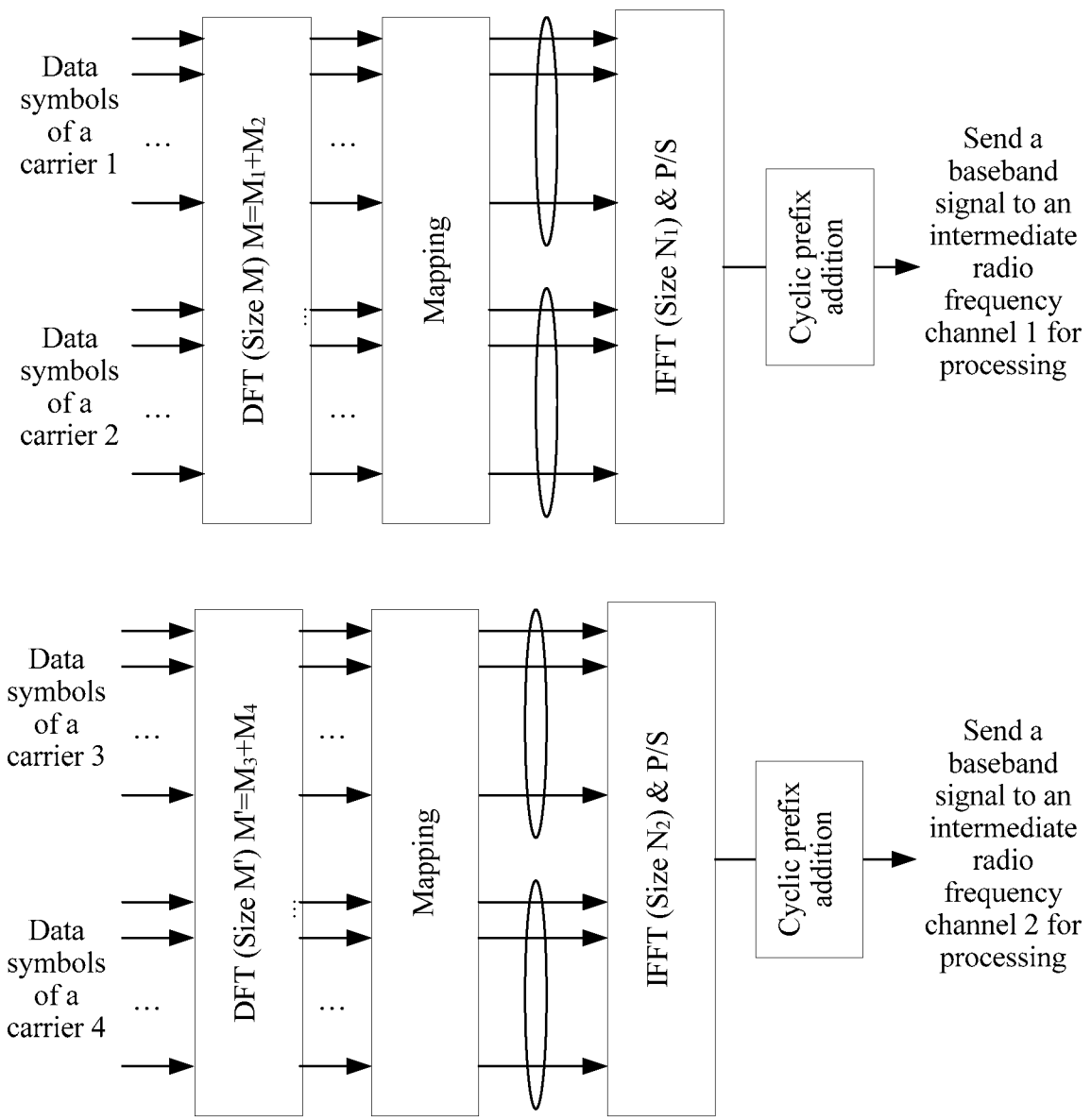
FIG. 8 is a schematic flowchart of a DFT-OFDM signal processing method according to yet another embodiment of the present disclosure.

If an intermediate radio frequency bandwidth cannot support performing IFFT on all carriers together, the intermediate radio frequency bandwidth may be divided into a plurality of intermediate radio frequency channels for signal transmission. Referring to FIG. 8, for example, there are four carriers, and the four carriers are non-contiguous on a spectrum. The solution in FIG. 4 is used for carriers 1 and 2 to send an output signal to an intermediate radio frequency channel 1. The solution in FIG. 4 is also used for carriers 3 and 4 to send an output signal to an intermediate radio frequency channel 2. Certainly, if the carriers 3 and 4 are contiguous, the solution in FIG. 3 may also be used to send an output signal to the intermediate radio frequency channel 2. The same is true for more carriers. Likewise, this is also applicable when there are a plurality of physical resource blocks.

Figure 1:
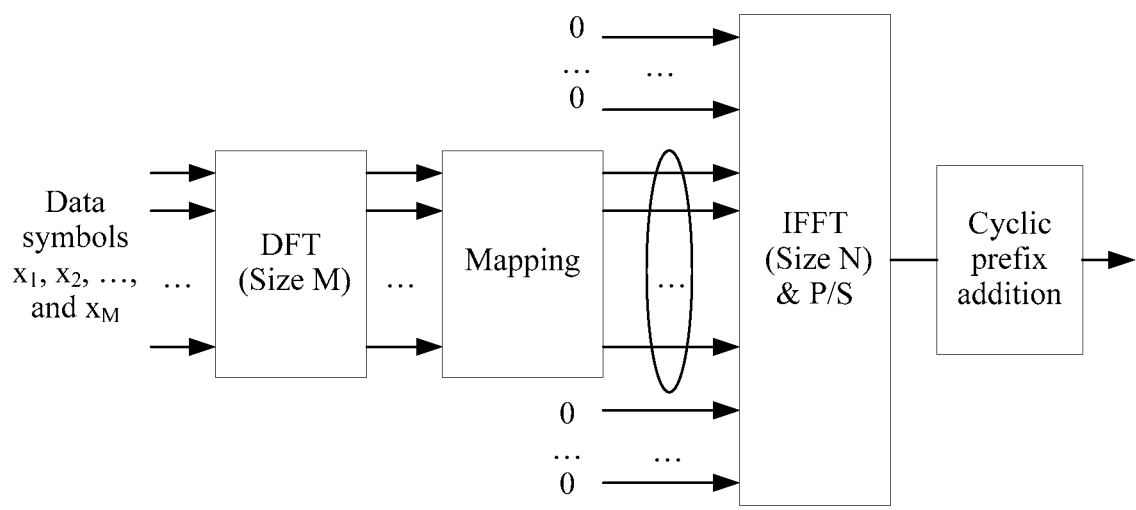
FIG. 1 is a schematic flowchart of a DFT-OFDM signal processing method in the prior art.
Figure 2:
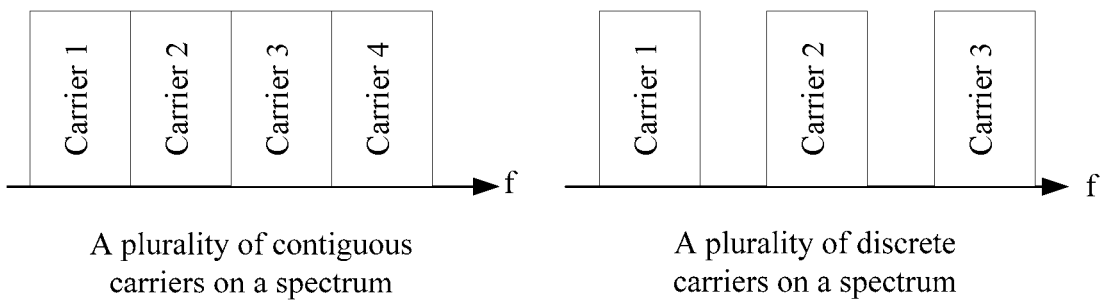
FIG. 2 is a schematic occupation diagram of a plurality of carriers on a spectrum.

For one of different intermediate radio frequency channels, a conventional signal processing method in FIG. 3 may be used, or the solution in FIG. 4 may be used. For a single carrier, the solution in FIG. 1 may be used, or the foregoing solutions may be freely combined based on a specific situation, or the solution in FIG. 5 may also be combined with the foregoing solutions.

In the foregoing embodiments, to reduce out-of-band spectrum leakage of a single carrier signal and meet an out-of-band leakage requirement of a wireless communications system, a filter may be added after the OFDM processing to eliminate out-of-band leakage of the single carrier signal. For example, a filtering step may be added after the step of IFFT, parallel-to-serial conversion, or cyclic prefix addition, to filter a DFT-OFDM signal. A filter for filtering a symbol output by the mapping unit may alternatively be added after the mapping unit, to filter out a signal other than the mapped subcarrier. Optionally, a filter may be added after the DFT unit, to filter a symbol output by the DFT unit.

In the solutions of the foregoing embodiments of the present disclosure, a DFT order M of a transmit end varies with a total quantity of scheduled subcarriers, and numbers ($i_k$, $i_k+1$, ..., and $i_k+M_k-1$, where k=1, 2, ..., and K) of subcarriers in IFFT that are scheduled at different times are different. Therefore, during receiving detection, a receive end needs to know a value of the DFT order M, a value of K, and the numbers of the subcarriers corresponding to the IFFT. The transmit end may send, in advance, subcarrier configuration information to the receive end by using signaling, so that the receive end detects and demodulates a DFT-OFDM signal. The transmit end herein may be a network device such as a base station or an AP, or may be a terminal device. Before corresponding steps in each embodiment are performed, a corresponding parameter may be sent to the receive end by using the following methods.

(1) The transmit end sends the subcarrier configuration information to the receive end in advance, and the subcarrier configuration information is M and the numbers ($i_k$, $i_k+1$, ..., and $i_k+M_k-1$) of the subcarriers corresponding to the IFFT in the foregoing embodiments. In other words, the foregoing parameters are sent to the receive end in advance before the corresponding steps in the foregoing embodiments are performed.

(2) It is also feasible to send only numbers ($i_k$, $i_k+1$, ..., and $i_k+M_k-1$) of subcarriers occupied on each carrier to the receive end, so that the receive end may obtain the value of M based on a quantity of the numbers.

(3) If each of the K carriers sends data by occupying an entire carrier bandwidth, the transmit end needs to send only number information of an occupied carrier to the receive end. Information about M and the numbers of the subcarriers corresponding to the IFFT may be calculated based on carrier numbers.

(4) The transmit end sends a number of a to-be-occupied resource block to the receive end, where the resource block is a segment of contiguous subcarriers in the IFFT unit, resource blocks have a same fixed quantity of subcarriers, and the resource blocks are sequentially numbered in the IFFT unit. In this way, the receive end may calculate the DFT order M and the numbers of the corresponding subcarriers in the IFFT unit based on the received number of the resource block.

(5) A subcarrier combination of each carrier is defined in a protocol, and the subcarrier combination is numbered, so that the transmit end needs to send only a subcarrier combination number to the receive end, and may further send a carrier number to the receive end. The receive end may obtain a subcarrier number and M based on the received subcarrier combination number and the definition in the protocol. For example, when there are X subcarriers on a carrier, a table of subcarrier combinations is defined as follows, and the table includes five subcarrier combinations. Certainly, a definition manner of the subcarrier combinations is not limited to the following table.

| Subcarrier combination number | Subcarrier number (i = 1, 2, . . . , and X) |
| --- | --- |
| 1 | Mod(i, 5) = 0 |
| 2 | Mod(i, 5) = 1 |
| 3 | Mod(i, 5) = 2 |
| 4 | Mod(i, 5) = 3 |
| 5 | Mod(i, 5) = 4 |

(6) A resource block combination is defined in a protocol, and the combination is numbered, so that the transmit end needs to send only a number of a to-be-occupied resource block combination to the receive end. The receive end may obtain a number of each resource block and M based on the received resource block combination number and the definition in the protocol. A specific numbering method is similar to the foregoing subcarrier numbering method.

Figure 9:
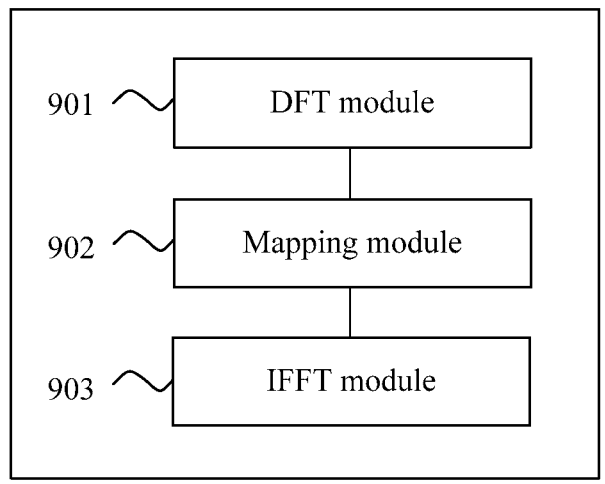
FIG. 9 is a schematic diagram of a DFT-OFDM signal processing apparatus according to an embodiment of the present disclosure.

The foregoing method embodiments may be performed by a network side device, for example, an access network element such as a base station or an access point AP, or may be performed by user equipment, for example, a mobile phone, a notebook computer, an in-vehicle mobile apparatus, a VR (virtual reality) device, or an AR (Augmented Reality) device. Corresponding to an entity for performing the foregoing methods in the embodiments in FIG. 4 and FIG. 5, the present disclosure further provides a signal processing apparatus. Referring to FIG. 9, the apparatus includes:

a discrete Fourier transform DFT module 901, configured to: perform discrete Fourier transform DFT on a data symbol block including M data symbols, and output M symbols obtained after the DFT, where the M data symbols belong to K carriers, and at least two adjacent carriers in the K carriers are non-contiguous on a spectrum; or the M data symbols belong to K physical resource blocks of one carrier, and at least two adjacent physical resource blocks in the K physical resource blocks are non-contiguous on a spectrum;

a mapping module 902, configured to map the M symbols obtained after the DFT to M subcarriers corresponding to inverse fast Fourier transformation IFFT;

and an IFFT module 903, configured to perform N-order IFFT on a plurality of mapped symbols, where N≥M and K≥2.

The IFFT module 903 may be referred to as an OFDM module, and IFFT processing is a part of OFDM processing.

The foregoing modules are separately configured to perform corresponding steps in the method embodiment in FIG. 4, or are separately configured to perform corresponding steps in the method embodiment in FIG. 5.

Further, when N is greater than M, the IFFT module 903 is further configured to set, to 0, a subcarrier symbol to which no mapped symbol is input.

Further, the mapping module 902 is specifically configured to:

sequentially map, based on numbers of subcarriers corresponding to the IFFT module 903, the M symbols obtained after the DFT to M subcarriers corresponding to the IFFT module 903.

$M=M_1+M_2+ \ldots M_k$, where $k=1,2,\ldots$, and $K$; and when the M data symbols belong to the K carriers, M is a quantity of subcarriers that are of the K carriers and that are used for data transmission, and $M_k$ is a quantity of subcarriers of a $k^{th}$ carrier that are used for data transmission; or when the M data symbols belong to the K physical resource blocks of one carrier, M is a quantity of subcarriers occupied by the K physical resource blocks for data transmission, and $M_k$ is a quantity of subcarriers occupied by a $k^{th}$ physical resource block for data transmission.

Further, the M symbols obtained after the DFT are (D[1], D[2], . . . , and D[M]), and a mapping process of the mapping module 902 specifically includes:

for a first carrier or physical resource block, $X[i_1]=D[1]$, $X[i_1+1]=D[2], \ldots$, and $X[i_1+M_1-1]=D[M_1]$;

for a second carrier or physical resource block, $X[i_2]=D[M_1+1]$, $X[i_2+1]=D[M_1+2], \ldots$, and $X[i_2+M_2-1]=D[M_1+M_2]$;

. . .

for a $K^{th}$ carrier or physical resource block, $X[i_K]=D[M_1+M_2+ \ldots +M_{k-1}+1]$, $X[i_K+1]=D[M_1+M_2+ \ldots +M_{k-1}+2], \ldots$, and $X[i_K+M_k-1]=D[M_1+M_2+ \ldots +M_k]$; and if m is not included in the numbers $\{i_k, i_k+1, \ldots ,$ and $i_k+M_k-1$, where $k=1, 2, \ldots ,$ and $K\}$, $X[m]=0$, where $X[m]$ is an input subcarrier symbol corresponding to the IFFT module, and $m=1, 2, \ldots ,$ and $N$;

subcarriers of the N-order IFFT are numbered as 1, 2, . . . , and N; and subcarriers of the $K^{th}$ carrier or physical resource block corresponding to the IFFT are numbered as $i_k, i_k+1, \ldots ,$ and $i_k+M_k-1$, where $k=1, 2, \ldots ,$ and K.

Optionally, $M=2^Q$, and Q is a natural number.

For another specific function, refer to description of a corresponding unit in each embodiment. Details are not described.

Figure 10:
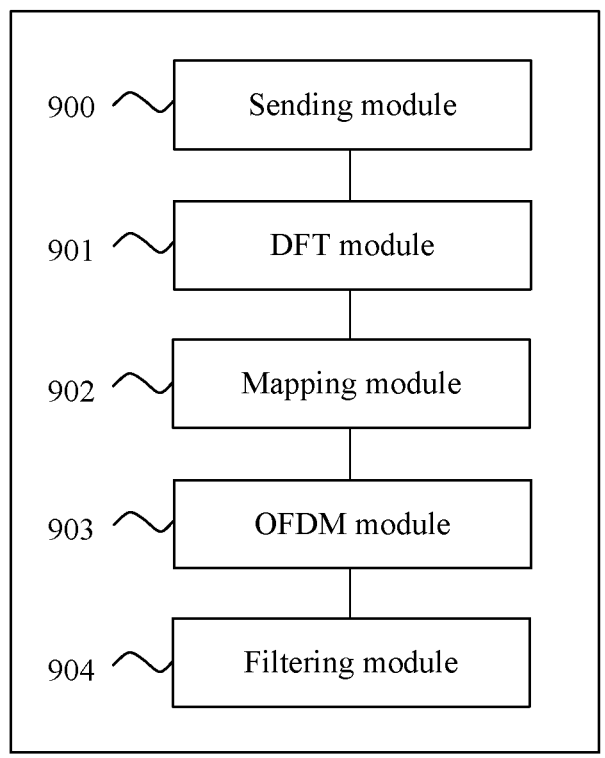
FIG. 10 is a schematic diagram of a DFT-OFDM signal processing apparatus according to another embodiment of the present disclosure.

Referring to FIG. 10, the apparatus may further include a sending module 900, configured to send subcarrier configuration information to a receive end. Content of the configuration information is recorded in the method embodiments, and is not described in detail again.

The apparatus may further include a parallel-to-serial conversion module and a cyclic prefix addition module (not shown in the figure). The IFFT, parallel-to-serial conversion, and cyclic prefix addition belong to an existing OFDM processing technology, and are not described in detail. The three modules may be collectively referred to as an OFDM module.

Corresponding to a filtering step in the method embodiments, a filtering module 904 may be added in this apparatus embodiment. The filtering module 904 may be specifically a filter, and the module may be located after the IFFT module 903 (an OFDM module 903 in the figure), or may be located between the DFT module 901 and the mapping module 902, or may be located between the mapping module 902 and the IFFT module 903 (an OFDM module 903 in the figure), or may be located between the IFFT module and the parallel-to-serial conversion module or between the parallel-to-serial conversion module and the cyclic prefix addition module, to filter a symbol or signal output by a corresponding module.

The apparatus shown in FIG. 9 or FIG. 10 can implement the processes implemented in the foregoing method embodiments. To avoid repetition, details are not described herein again.

In another embodiment, the apparatus may be a chip, and the foregoing functions are implemented by using the chip. Specifically, the apparatus includes an integrated circuit, configured to implement a corresponding function of each module.

Figure 11:
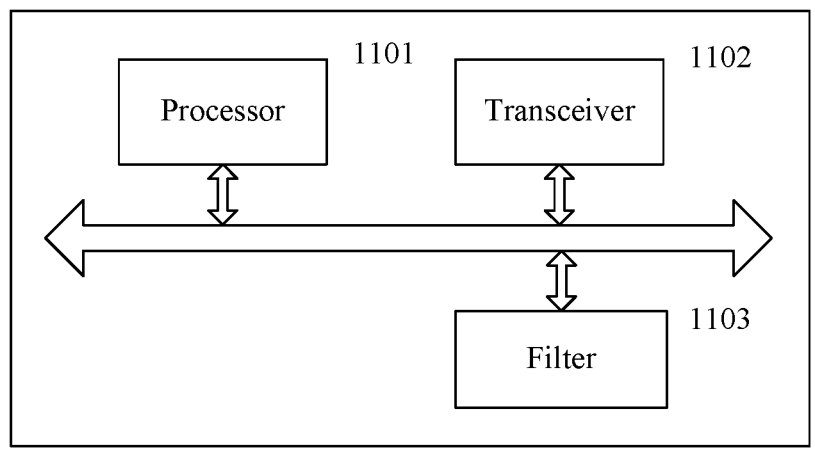
FIG. 11 is a schematic diagram of a DFT-OFDM signal processing apparatus according to still another embodiment of the present disclosure.

There is another form of embodiment for the foregoing apparatus embodiment. Referring to FIG. 11, the apparatus includes a processor 1101 and a transceiver 1102. The transceiver 1102 is configured to transmit or receive a signal, and may implement a corresponding function of the sending module 900. The transceiver may include a transmitter and a receiver. The processor 1101 is configured to execute various processing procedures, for example, may implement a function of any one or more of the DFT module 901, the mapping module 902, the IFFT module 903, and the like in the apparatus shown in FIG. 9 or FIG. 10. For example, the DFT module 901 is implemented by an independent module, and the mapping module 902 and the IFFT module 903 are implemented by the processor 1101; or a function of the DFT module 901 is implemented by the processor 1101, and functions of the mapping module 902 and the IFFT module 903 are implemented by independent modules; or all the foregoing three modules are implemented by the processor. Various flexible design manners may be used in specific implementation, and are not limited in the present disclosure.

In addition, the apparatus may further include a filter 1103, to implement a corresponding function of the filtering module 904.

Optionally, components of the apparatus in FIG. 11 are coupled together by using a bus system. In addition to a data bus, the bus system includes a power bus, a control bus, and a status signal bus.

Corresponding to another form of embodiment, a function of the filter may alternatively be implemented by the processor.

According to the signal processing method and apparatus provided in the present disclosure, discrete Fourier transform DFT and mapping processing are performed on a data symbol block including data symbols of non-contiguous carriers or physical resource blocks, and then IFFT is performed, to maintain a relatively low PAPR of a processed DFT-OFDM signal, thereby improving wireless signal transmission reliability, and reducing a PARR of a single carrier signal especially in a carrier aggregation scenario or a scenario in which a plurality of non-contiguous PRBs are allocated to one carrier.

Figure 12:
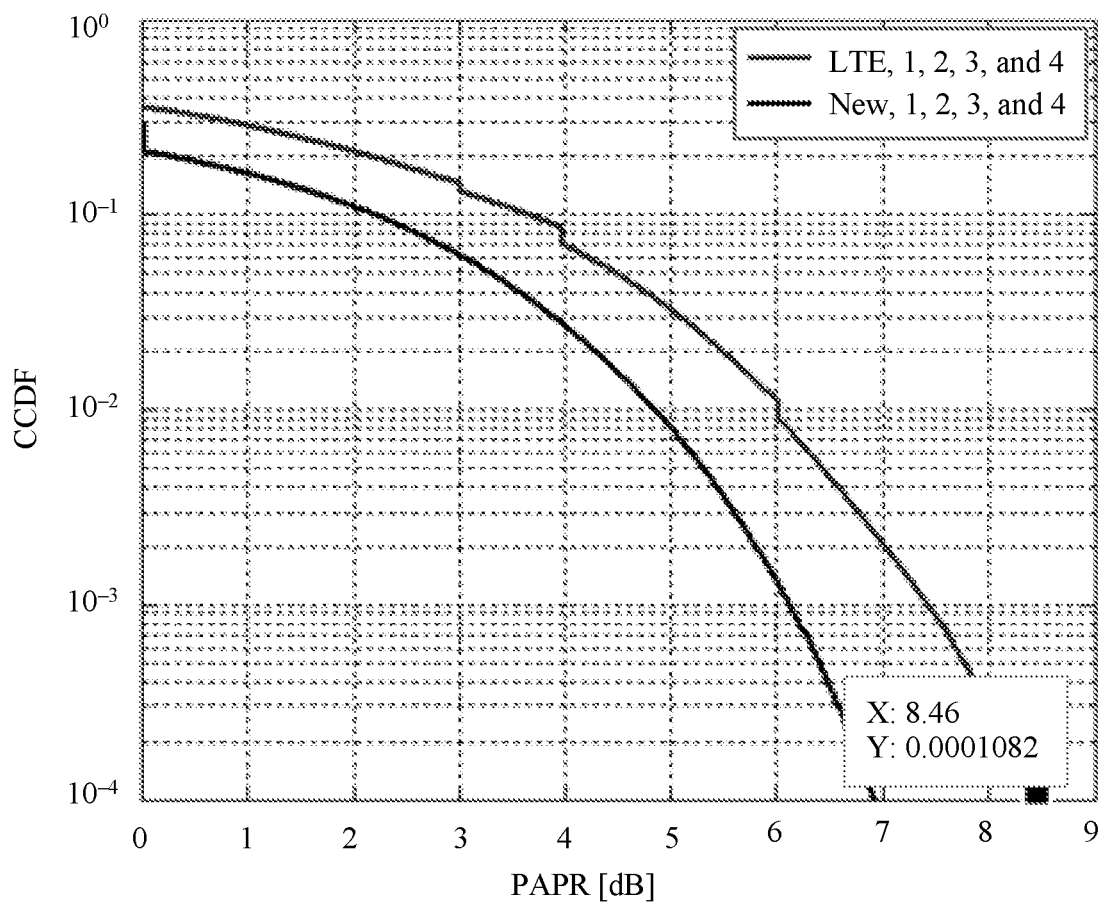
FIG. 12 is a diagram of comparison between PAPR performance curves obtained by using a solution in an embodiment of the present disclosure and an existing LTE single carrier processing solution.

It is assumed that there are K=4 contiguous carriers, and the carriers have a same bandwidth. A user selects all the four carriers to send data. Numbers of the selected carriers are {1, 2, 3, 4}. N=4096. Each carrier has 512 subcarriers. The data symbol is a randomly generated QPSK (quadrature phase shift keying) symbol. FIG. 12 shows comparison between PAPR performance curves obtained by using the solution of the present disclosure and an existing LTE technology. In an existing LTE single carrier signal processing method, PAPR@CCDF=10−4=8.46 dB. After the method in the present disclosure is used, an obtained PAPR is equal to 6.89 dB, which is reduced by 1.57 dB compared with the PAPR in the existing processing method in LTE.

It should be understood that in the embodiments of the present disclosure, the processor may be a central processing unit (CPU), or the processor may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor or the processor may be any conventional processor or the like.

The memory may include a read-only memory and a random access memory, and provide an instruction and data to the processor. A part of the memory may further include a non-volatile random access memory. For example, the memory may further store information of a device type.

The bus system may further include a power bus, a control bus, a status signal bus, and the like, in addition to a data bus. However, for clear description, various types of buses in the figure are marked as the bus system.

It should be understood that the term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A signal processing method, comprising:
   performing discrete Fourier transform (DFT) on a data symbol block comprising M data symbols, wherein:
      the M data symbols obtained after the DFT belong to K carriers, and at least two adjacent carriers in the K carriers are non-contiguous on a spectrum; or
      the M data symbols obtained after the DFT belong to K physical resource blocks of one carrier, and at least two adjacent physical resource blocks in the K physical resource blocks are non-contiguous on a spectrum;
   mapping the M symbols obtained after the DFT to M subcarriers corresponding to inverse fast Fourier transformation (IFFT); and
   performing N-order IFFT on a plurality of mapped symbols, wherein N≥M and K≥2.

2. The method according to claim 1, wherein, if N is greater than M,
   the plurality of mapped symbols comprise symbols that are generated after mapping of the M symbols of the K carriers and a symbol that is generated after DFT and mapping processing are performed on a data symbol of a carrier other than the K carriers; or
   the plurality of mapped symbols comprise symbols that are generated after mapping of the M symbols of the K physical resource blocks and a symbol that is generated after DFT and mapping processing are performed on a data symbol of a physical resource block other than the K physical resource blocks.

3. The method according to claim 1, wherein, if N is greater than M, before the performing N-order IFFT on a plurality of mapped symbols, the method further comprises:
   setting, to 0, a subcarrier symbol that corresponds to the IFFT and to which no mapped symbol is input.

4. The method according to claim 1, wherein the mapping the M symbols obtained after the DFT to M subcarriers corresponding to IFFT comprises:
   sequentially mapping, based on numbers of the subcarriers corresponding to the IFFT, the M symbols obtained after the DFT to M subcarriers corresponding to the IFFT.

5. The method according to claim 1, wherein $M=M_1+M_2+\ldots M_k$, and $k=1, 2, \ldots,$ and K; and
   if the M data symbols belong to the K carriers, M is a quantity of subcarriers that are of the K carriers and that are used for data transmission, and $M_k$ is a quantity of subcarriers of a $k^{th}$ carrier that are used for data transmission; or
   if the M data symbols belong to the K physical resource blocks of one carrier, M is a quantity of subcarriers occupied by the K physical resource blocks for data transmission, and $M_k$ is a quantity of subcarriers occupied by a $k^{th}$ physical resource block for data transmission.

6. The method according to claim 5, wherein the M symbols obtained after the DFT are (D[1], D[2], . . . , and D[M]), and the step of mapping specifically comprises:
   for a first carrier or physical resource block, $X[i_1]=D[1]$, $X[i_1+1]=D[2], \ldots,$ and $X[i_1+M_1-1]=D[M_1]$;
   for a second carrier or physical resource block, $X[i_2]=D[M_1+1]$, $X[i_2+1]=D[M_1+2], \ldots,$ and $X[i_2+M_2-1]=D[M_1+M_2]$;
   . . .
   for a $K^{th}$ carrier or physical resource block, $X[i_K]=D[M_1+M_2+\ldots+M_{k-1}+1]$, $X[i_K+1]=D[M_1+M_2+\ldots+M_{k-1}+2], \ldots,$ and $X[i_K+M_K-1]=D[M_1+M_2+\ldots+M_k]$; and
   if m is not comprised in the numbers $\{i_k+1, \ldots,$ and $i_k+M_k-1$, wherein $k=1, 2, \ldots,$ and $K\}$, $X[m]=0$, wherein
   $X[m]$ is an input subcarrier symbol corresponding to the IFFT, and $m=1, 2, \ldots,$ and N;
   subcarriers of the N-order IFFT are numbered as 1, 2, . . . , and N; and
   subcarriers of the $K^{th}$ carrier or physical resource block corresponding to the IFFT are numbered as $i_k$, $i_k+1, \ldots,$ and $i_k+M_k-1$, wherein $k=1, 2, \ldots,$ and K.

7. The method according to claim 1, wherein $M=2^Q$, and Q is a natural number.

8. The method according to claim 1, wherein the method further comprises:
   sending subcarrier configuration information corresponding to the IFFT to a receive end.

9. A signal processing apparatus, comprising:
   at least one processor; and
   a non-transitory computer-readable storage medium coupled to the at least one processor and storing programming instructions for execution by the at least one processor, wherein the programming instructions instruct the at least one processor to:
   perform discrete Fourier transform (DFT) on a data symbol block comprising M data symbols, wherein:
      the M data symbols obtained after the DFT belong to K carriers, and at least two adjacent carriers in the K carriers are non-contiguous on a spectrum; or
      the M data symbols obtained after the DFT belong to K physical resource blocks of one carrier, and at least two adjacent physical resource blocks in the K physical resource blocks are non-contiguous on a spectrum;

map the M symbols obtained after the DFT to M subcarriers corresponding to inverse fast Fourier transformation (IFFT); and perform N-order IFFT on a plurality of mapped symbols, wherein N≥M and K≥2.

10. The apparatus according to claim 9, wherein if N is greater than M, the plurality of mapped symbols comprise symbols that are generated after mapping of the M symbols of the K carriers and a symbol that is generated after DFT and mapping processing are performed on a data symbol of a carrier other than the K carriers; or the plurality of mapped symbols comprise symbols that are generated after mapping of the M symbols of the K physical resource blocks and a symbol that is generated after DFT and mapping processing are performed on a data symbol of a physical resource block other than the K physical resource blocks.

11. The apparatus according to claim 9, wherein if N is greater than M, the programming instructions instruct the at least one processor to set, to 0, a subcarrier symbol to which no mapped symbol is input.

12. The apparatus according to claim 9, wherein the programming instructions instruct the at least one processor to:

sequentially map, based on numbers of subcarriers corresponding to the IFFT, the M symbols obtained after the DFT to M subcarriers corresponding to the IFFT.

13. The apparatus according to claim 9, wherein the programming instructions instruct the at least one processor to filter the M data symbols obtained after the DFT, the mapped symbols, or a signal output after performing the N-order IFFT.

14. The apparatus according to claim 9, wherein the programming instructions instruct the at least one processor to send subcarrier configuration information corresponding to the IFFT to a receive end.

15. A non-transitory computer-readable medium having computer program instructions which, when executed by at least one processor, cause the at least one processor to perform operations comprising:

performing discrete Fourier transform (DFT) on a data symbol block comprising M data symbols, wherein:

the M data symbols obtained after the DFT belong to K carriers, and at least two adjacent carriers in the K carriers are non-contiguous on a spectrum; or the M data symbols obtained after the DFT belong to K physical resource blocks of one carrier, and at least two adjacent physical resource blocks in the K physical resource blocks are non-contiguous on a spectrum;

mapping the M symbols obtained after the DFT to M subcarriers corresponding to inverse fast Fourier transformation (IFFT); and performing N-order IFFT on a plurality of mapped symbols, wherein N≥M and K≥2.

16. The non-transitory computer-readable medium according to claim 15, wherein if N is greater than M, the plurality of mapped symbols comprise symbols that are generated after mapping of the M symbols of the K carriers and a symbol that is generated after DFT and mapping processing are performed on a data symbol of a carrier other than the K carriers; or the plurality of mapped symbols comprise symbols that are generated after mapping of the M symbols of the K physical resource blocks and a symbol that is generated after DFT and mapping processing are performed on a data symbol of a physical resource block other than the K physical resource blocks.

17. The non-transitory computer-readable medium according to claim 15, wherein if N is greater than M, before the performing N-order IFFT on a plurality of mapped symbols, the operations further comprises:

setting, to 0, a subcarrier symbol that corresponds to the IFFT and to which no mapped symbol is input.

18. The non-transitory computer-readable medium according to claim 15, wherein the mapping the M symbols obtained after the DFT to M subcarriers corresponding to IFFT comprises:

sequentially mapping, based on numbers of the subcarriers corresponding to the IFFT, the M symbols obtained after the DFT to M subcarriers corresponding to the IFFT.

19. The non-transitory computer-readable medium according to claim 15, wherein $M=M_1+M_2+ \ldots M_k$, and $k=1, 2, \ldots,$ and K; and if the M data symbols belong to the K carriers, M is a quantity of subcarriers that are of the K carriers and that are used for data transmission, and $M_k$ is a quantity of subcarriers of a $k^{th}$ carrier that are used for data transmission; or if the M data symbols belong to the K physical resource blocks of one carrier, M is a quantity of subcarriers occupied by the K physical resource blocks for data transmission, and $M_k$ is a quantity of subcarriers occupied by a $k^{th}$ physical resource block for data transmission.

20. The non-transitory computer-readable medium according to claim 19, wherein the M symbols obtained after the DFT are (D[1], D[2], . . . , and D[M]), and the step of mapping specifically comprises:

for a first carrier or physical resource block, $X[i_1]=D[1]$, $X[i_1+1]=D[2], \ldots,$ and $X[i_1+M_1-1]=D[M_1]$;

for a second carrier or physical resource block, $X[i_2]=D[M_1+1]$, $X[i_2+1]=D[M_1+2], \ldots,$ and $X[i_2+M_2-1]=D[M_1+M_2]$;

. . .

for a $K^{th}$ carrier or physical resource block, $X[i_K]=D[M_1+M_2+ \ldots +M_{k-1}+1]$, $X[i_K+1]=D[M_1+M_2+ \ldots +M_{k-1}+2], \ldots,$ and $X[i_K+M_K-1]=D[M_1+M_2+ \ldots +M_K]$; and if m is not comprised in the numbers $\{i_k, i_k+1, \ldots,$ and $i_k+M_k-1$, wherein $k=1, 2, \ldots,$ and K$\}$, $X[m]=0$, wherein X[m] is an input subcarrier symbol corresponding to the IFFT, and $m=1, 2, \ldots,$ and N;

subcarriers of the N-order IFFT are numbered as 1, 2, . . . , and N; and subcarriers of the $K^{th}$ carrier or physical resource block corresponding to the IFFT are numbered as $i_k$, $i_k+1, \ldots,$ and $i_k+M_k-1$, wherein $k=1, 2, \ldots,$ and K.

* * * * *

UNITED STATES PATENT AND TRADEMARK OFFICE
CERTIFICATE OF CORRECTION

PATENT NO. : 10,659,271 B2
APPLICATION NO. : 16/225220
DATED : May 19, 2020
INVENTOR(S) : Yi Wang et al.

Page 1 of 1

It is certified that error appears in the above-identified patent and that said Letters Patent is hereby corrected as shown below:

In the Claims

In Column 20, Line 35, in Claim 6, delete "$\{i_k+1,$" and insert -- $\{i_k, i_k+1,$ --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*